United States Patent Office 3,345,367
Patented Oct. 3, 1967

3,345,367
SUBSTITUTED 7-ACETYLAMINO
CEPHALOSPORANIC ACIDS
Martin Leon Sassiver, Pearl River, and Benjamin Arthur
Lewis, Suffern, N.Y., and Robert Gordon Shepherd,
Ridgewood, N.J., assignors to American Cyanamid
Company, Stamford, Conn., a corporation of Maine
No Drawing. Filed Feb. 15, 1967, Ser. No. 616,176
10 Claims. (Cl. 260—243)

ABSTRACT OF THE DISCLOSURE

This disclosure describes compounds of the class of 7 - (5,6,7,8 - tetrahydronaphthyl - 1 - oxyacetylamino) cephalosporanic acids and 7-(5,6,7,8-tetrahydronaphthyl-2-oxyacetylamino)cephalosporanic acids, useful as antibacterial agents.

*Brief summary of the invention*

This invention relates to new derivatives of 7-aminocephalosporanic acid and, more particularly, is concerned with novel compounds which may be represented by the following general formulae:

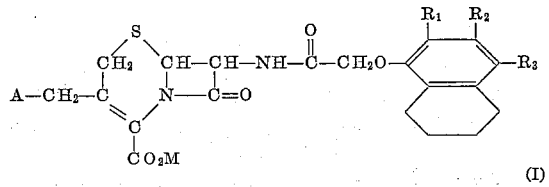

(I)

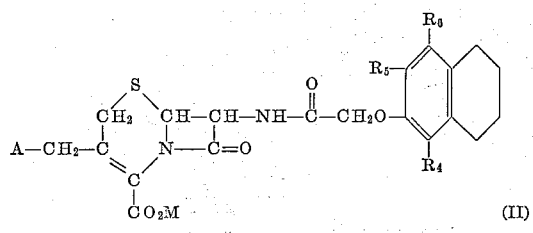

(II)

wherein $R_1$, $R_2$, $R_3$, $R_4$, $R_5$ and $R_6$ are each selected from the group consisting of hydrogen, methyl, chloro and bromo; A is acetoxy or N-pyridinium; and M is hydrogen, pharmaceutically acceptable non-toxic cations or an anionic charge when A is N-pyridinium.

*Detailed description of the invention*

In the general Formulae (I) and (II) set forth above, in those instances where A is N-pyridinium, the cationic charge on this group is matched by the anionic charge of the carboxylic acid radical, the entire molecule being of a zwitterion nature and M is thus an anionic charge. Typical 5,6,7,8-tetrahydronaphthyloxyacetyl groups contemplated by the present invention are, for example, 5,6,7,8-tetrahydronaphthyl-1-oxyacetyl, 2-chloro-5,6,7,8-tetrahydronaphthyl-1-oxyacetyl, 3-bromo-5,6,7,8-tetrahydronaphthyl-1-oxyacetyl, 4-bromo-5,6,7,8-tetrahydronaphthyl-1-oxyacetyl, 2,4-dichloro-5,6,7,8-tetrahydronaphthyl-1 - oxyacetyl, 2 - methyl - 5,6,7,8 - tetrahydronaphthyl - 1-oxyacetyl, 3,4-dimethyl-5,6,7,8-tetrahydronaphthyl-1-oxyacetyl, 1 - methyl - 5,6,7,8 - tetrahydronaphthyl - 2 - oxyacetyl, 3,4 - dimethyl - 5,6,7,8 - tetrahydronaphthyl - 2-oxyacetyl, 5,6,7,8-tetrahydronaphthyl-2-oxyacetyl, 1-chloro - 5,6,7,8 - tetrahydronaphthyl - 2 - oxyacetyl, 3 - chloro-5,6,7,8-tetrahydronaphthyl-2-oxyacetyl, 4-bromo-5,6,7,8-tetrahydronaphthyl-2-oxyacetyl, 1,3-dichloro-5,6,7,8-tetrahydronaphthyl-2-oxyacetyl, and the like.

Also embraced within the scope of the present invention are the non-toxic pharmaceutically acceptable salts of these derivatives of 7-aminocephalosporanic acid. The cations comprised in these salts and embraced by M include, for example, the non-toxic metal cations such as the sodium ion, potassium ion, calcium ion, magnesium ion as well as the organic amine cations, such as the tri(lower alkyl)amine cations (e.g. triethylamine), procaine, and the like.

The novel compounds of the present invention, when A is acetoxy in Formulae (I) and (II) above, may be readily prepared by acylating 7-aminocephalosporanic acid with a compound which may be represented by the following general formulae:

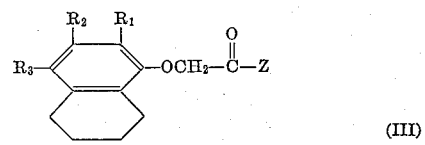

(III)

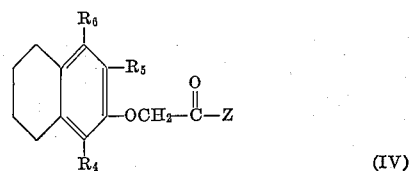

(IV)

wherein $R_1$, $R_2$, $R_3$, $R_4$, $R_5$ and $R_6$ are as hereinbefore defined and Z is a halide (preferably chloride), azide, acyloxy or p-nitrophenoxy group. This acylation of the 7-aminocephalosporanic acid is performed, for example, by the Schotten-Baumann method, taking into consideration the sensitivity of these compounds, under mild conditions and advantageously in the presence of a diluent or solvent such as water or an organic solvent, for example, a ketone such as acetone, an ether such as tetrahydrofuran, or a halogenated hydrocarbon such as chloroform or methylene chloride. The reaction is preferably conducted in the presence of a basic agent such as sodium bicarbonate or potassium bicarbonate, or an organic base such as one of the organic bases listed hereinbefore. The reaction is also preferably carried out at a temperature of from about 0° C. to about 25° C., preferably at 0° C.– 5° C., and over a period of time of a few hours or more.

The acylating agents corresponding to the formulae (III) and (IV), when new, may be prepared by methods well-known in the art from the corresponding acids (Z is hydroxy). Thus, the acid can be treated with thionyl chloride or oxalyl chloride, if desired in the presence of dimethylformamide, to yield the corresponding acyl chlorides (Z is chlorine), which, if desired, can be converted to the acyl azides (Z is $N_3$) by treatment with sodium azide. The p-nitrophenyl esters (Z is p-nitrophenoxy) can be prepared by following the procedure of Bodanszky et al. (Biochemical Preparations, vol. 9, p. 110, 1962, John Wiley and Sons, New York, N.Y.). Specific acylating agents operable in this process include, for example, 5,6,7,8-tetrahydronaphthyl-1-oxyacetyl chloride, 2-chloro-5,6,7,8-tetrahydronaphthyl-1-oxyacetyl bromide, 3-methyl-5,6,7,8-tetrahydronaphthyl-1-oxyacetyl azide, p-nitrophenyl 4-bromo-5,6,7,8-tetrahydronaphthyl-1-oxyacetate, 2,4-dichloro-5,6,7,8 - tetrahydronaphthyl - 1 - oxyacetyl chloride, 5,6,7,8 - tetrahydronaphthyl-2-oxyacetyl chloride, 1 - chloro - 5,6,7,8-tetrahydronaphthyl-2-oxyacetyl bromide, 3 - methyl - 5,6,7,8-tetrahydronaphthyl-2-oxyacetylazide, p-nitrophenyl 4-bromo-5,6,7,8 - tetrahydronaphthyl-2-oxyacetate, 1,3 - dichloro-5,6,7,8-tetrahydronaphthyl-2-oxyacetyl chloride, and the like. The intermediate tetrahydronaphthyloxyacetic acids (Z is hydroxy) corresponding to Formulae (III) and (IV) above may be prepared from the corresponding substituted tetrahydronaphthols by treatment with chloroacetic acid.

The novel compounds of the present invention, when A is N-pyridinium in Formulae (I) and (II) above, may be readily prepared from the corresponding 7-aminocephalosporanic acid derivatives (A is acetoxy in Formulae (I) and (II) above) by treatment with pyridine in water or aqueous acetone at 20°–50° C. and for a period of time of about 1–3 days. The resulting 3-(1-pyridylmethyl)-3-cephem-4-carboxylic acid betaines may then be isolated by standard procedures of precipitation and crystallization.

Depending on the reaction conditions used, the new compounds of the present invention are obtained in the free form or in the form of their salts. From the salts it is possible to prepare the acids in known manner, or from the acids the salts are readily accessible, for example, by reaction with hydroxides, carbonates or bicarbonates of alkali metals or alkaline earth metals, or with organic amines.

The novel compounds of the present invention are biologically active and have been found to possess antibacterial activity. As indicated, they are useful antimicrobial agents and have high antimicrobal activity in vitro against standard laboratory microorganisms used to screen for activity against pathogens. The antibacterial spectrum of typical compounds of the present invention, representing the concentration required to inhibit the growth of various typical bacteria, was determined in a standard manner by the agar-dilution streak-plate technique which is commonly used in testing new antibiotics. The following table summarizes the in vitro activity of 7 - (5,6,7,8 - tetrahydronaphthyl - 1 - oxyacetylamino) cephalosporanic acid (1), 7-(5,6,7,8-tetrahydronaphthyl-2-oxyacetylamino)cephalosporanic acid (2), and 7-(2,4-dichloro-5,6,7,8-tetrahydronaphthyl - 1-oxyacetylamino) cephalosporanic acid (3) as compared with Cephalosporin C (4) against a variety of disease-causing microorganisms.

| Organisms | Minimal inhibitory conc. (mcg./ml.) | | | |
|---|---|---|---|---|
| | (1) | (2) | (3) | (4) |
| Staphylococcus aureus No. 11 | 0.39 | 0.2 | 0.2 | 100 |
| Staphylococcus aureus ATCC 13709 | 0.1 | <0.05 | <0.05 | 50 |
| Streptococcus pyrogenes C-203 | 0.1 | <0.05 | <0.05 | 25 |
| Bacillus cereus ATCC 10702 | 0.2 | <0.05 | 1.56 | 100 |

The compounds of the present invention retained antibacterial activity after exposure to cephalosporinase, a bacterial enzyme, which completely destroyed the activity of Cephalosporin C under the same conditions.

The high in vitro antibacterial activity of the novel compounds of the present invention makes them useful as additives to materials which are subject to microbial deterioration such as cutting oils and fuel oils. They are also useful in soaps, shampoos and topical compositions for the treatment of wounds and burns.

The invention will be described in greater detail in conjunction with the following specific examples.

EXAMPLE 1

*Preparation of 7 - (5,6,7,8 - tetrahydronaphthyl - 1 - oxyacetylamino)cephalosporanic acid*

The acid chloride of 5,6,7,8-tetrahydronaphthyl-1-oxyacetic acid is prepared by reacting 412 mg. (2 mmole) of the acid with excess oxalyl chloride and vacuum-evaporating the excess oxalyl chloride. The acid chloride residue is dissolved in 5 ml. of acetone and added dropwise to a stirred, ice-cooled solution prepared by dissolving 548 mg. (2 mmole) of 7-aminocephalosporanic acid and 550 mg. (6.6 mmole) of sodium bicarbonate in 30 ml. of water and 24 ml. of acetone. The reaction mixture is stirred for 2 hours in an ice bath. The acetone is vacuum-evaporated and the residual aqueous solution acidified to pH 2 with hydrochloric acid. The solution is extracted three times with 25 milliliters each time of ethyl acetate which is then dried over magnesium sulfate. Evaporation gives 220 mg. of 7-(5,6,7,8-tetrahydronaphthyl-1-oxyacetylamino)cephalosporanic acid. The sodium salt is obtained by slurrying this product in 10 ml. of water and adding dilute sodium hydroxide dropwise to pH 5 to effect solution. Vacuum evaporation to a small volume and addition of a large quantity of acetone precipitates 204 mg. of sodium 7-(5,6,7,8-tetrahydronaphthyl-1-oxyacetylamino)cephalosporanate as a while solid.

EXAMPLE 2

*Preparation of 7-(4-methyl-5,6,7,8 - tetrahydronaphthyl-1-oxyacetylamino)cephalosporanic acid*

By replacing the 5,6,7,8-tetrahydronaphthyl-1-oxyacetyl chloride employed in Example 1 with an equimolecular quantity of 4 - methyl - 5,6,7,8 - tetrahydronaphthyl-1-oxyacetyl bromide and following substantially the same procedure described in Example 1, there is obtained the 7-(4-methyl-5,6,7,8 - tetrahydronaphthyl-1-oxyacetylamino)cephalosporanic acid.

EXAMPLE 3

*Preparation of 7 - (3-methyl-5,6,7,7-tetrahydronaphthyl-1-oxyacetylamino)cephalosporanic acid*

The procedure of Example 1 is repeated, substituting an equimolecular amount of 3-methyl-5,6,7,8-tetrahydronaphthyl-1-oxyacetyl azide for the 5,6,7,8-tetrahydronaphtyl-1-oxyacetyl chloride employed in that example. There is thus obtained the 7-(3-methyl-5,6,7,8-tetrahydronaphthyl - 1-oxyacetylamino)cephalosporanic acid.

EXAMPLE 4

*Preparation of 7-(1-methyl-5,6,7,8-tetrahydronaphthyl-2-oxyacetylamino)cephalosporanic acid*

In place of the 5,6,7,8-tetrahydronaphthyl-1-oxyacetyl chloride of Example 1, there is employed an equimolecular quantity of p-nitrophenyl 1-methyl-5,6,7,8-tetrahydronaphthyl-2-oxyacetate whereby the 7-(1-methyl-5,6,7,8-tetrahydronaphthyl-2-oxyacetylamino)cephalosporanic acid is obtained in equally good yield.

EXAMPLE 5

*Preparation of 7-(2,4-dichloro-5,6,7,8-tetrahydronaphthyl-1-oxyacetylamino)cephalosporanic acid*

In the manner described in Example 1, treatment of 7-aminocephalosporanic acid with 2,4-dichloro-5,6,7,8-tetrahydronaphthyl-1-oxyacetyl chloride produces the 7-(2, 4 - dichloro - 5,6,7,8-tetrahydronaphthyl-1-oxyacetylamino)cephalosporanic acid.

EXAMPLE 6

*Preparation of 7-(5,6,7,8-tetrahydronaphthyl-2-oxyacetylamino)cephalosporanic acid*

The acid chloride of 5,6,7,8-tetrahydronaphthyl-2-oxyacetic acid is prepared by reacting 412 mg. (2 mmole) of the acid with excess oxalyl chloride and vacuum-evaporating the excess oxalyl chloride. The acid chloride residue is dissolved in 5 ml. of acetone and added dropwise to a stirred, ice-cooled solution prepared by dissolving 548 mg. (2 mmole) of 7-amino)cephalosporanic acid and 500 mg. (6.6 mmole) of sodium bicarbonate in 30 ml. of water and 24 ml. of acetone. The reaction mixture is stirred for 2 hours in an ice bath. The acetone is vacuum evaporated and the residual aqueous solution acidified to pH 2 with hydrochloric acid. The solution is extracted three times with 25 milliliters each time of ethyl acetate which is then dried over magnesium sulfate. Evaporation gives 500 mg. of 7 - (5,6,7,8-tetrahydronaphthyl-2-oxyacetylamino)cephalosporanic acid. The sodium salt is obtained by slurrying this product in 10 ml. of water and adding dilute sodium hydroxide dropwise to pH 5 to effect solution. Vacuum evaporation to a small volume and addition of a large quantity of acetone precipitates 390 mg. of sodium 7 - (5,6,7,8 - tetrahydronaphthyl - 2-oxyacetylamino)cephalosporanate as a white solid.

EXAMPLE 7

*Preparation of 7-(1-chloro-5,6,7,8-tetrahydronaphthyl-2-oxyacetylamino)cephalosporanic acid*

By replacing the 5,6,7,8-tetrahydronaphthyl-2-oxyacetyl chloride employed in Example 6 with an equimolecular quantity of 1-chloro-5,6,7,8-tetrahydronaphthyl-2-oxyacetyl bromide and following substantially the same procedure described in Example 6, there is obtained the 7-(1-chloro-5,6,7,8 - tetrahydronaphthyl - 2-oxyacetylamino)cephalosporanic acid.

EXAMPLE 8

*Preparation of 7-(3-chloro-5,6,7,8-tetrahydronaphthyl-2-oxyacetylamino)cephalosporanic acid*

The procedure of Example 6 is repeated, substituting an equimolecular amount of 3-chloro-5,6,7,8-tetrahydronaphthyl-2-oxyacetyl azide for the 5,6,7,8-tetrahydronaphthyl-2-oxyacetyl chloride employed in that example. There is thus obtained the 7-(3-chloro-5,6,7,8-tetrahydronaphthyl-2-oxyacetylamino)cephalosporanic acid.

EXAMPLE 9

*Preparation of 7-(1,3-dichloro-5,6,7,8-tetrahydronaphthyl-2-oxyacetylamino)cephalosporanic acid*

In the manner described in Example 6, treatment of 7-aminocephalosporanic acid with 1,3-dichloro-5,6,7,8-tetrahydronaphthyl-2-oxyacetyl chloride produces the 7 - (1,3 - dichloro-5,6,7,8-tetrahydronaphthyl-2-oxyacetylamino)cephalosporanic acid.

EXAMPLE 10

*Preparation of 7-(5,6,7,8-tetrahydronaphthyl-1-oxyacetylamino) - 3 - (1 - pyridylmethyl)-3-cephem-4-carboxylic acid betaine*

One gram of the sodium salt of 7-(5,6,7,8-tetrahydronaphthyl-1-oxyacetylamino)cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give 250 mg. of the product.

EXAMPLE 11

*Preparation of 7-(5,6,7,8-tetrahydronaphthyl-2-oxyacetylamino) - 3 - (1 - pyridylmethyl)-3-cephem-4-carboxylic acid betaine*

One gram of the sodium salt of 7-(5,6,7,8-tetrahydronaphthyl-2-oxyacetylamino)cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

EXAMPLE 12

*Preparation of 5,6,7,8-tetrahydronaphthyl-1-oxyacetic acid*

A mixture of 14.8 g. (0.1 mole) of 5,6,7,8-tetrahydro-α-naphthol, 18.9 g. (0.2 mole) of chloroacetic acid, 20.0 g. (0.5 mole) of sodium hydroxide, 1.0 g. of potassium iodide and 300 ml. of acetone was refluxed for 20 hours. After evaporation of the acetone the residue was dissolved in one liter of warm water and acidified to pH 7 with hydrochloric acid. The solution was filtered, and the filtrate further acidified to give the crude 5,6,7,8-tetrahydronaphthyl-1-oxyacetic acid. Reprecipitation from water (charcoal treatment) gave 18.5 g. of product, M.P. 192°–194° C.

EXAMPLE 13

*Preparation of 2,4-dichloro-5,6,7,8-tetrahydronaphthyl-1-oxyacetic acid*

This acid can be synthesized from the known 2,4-dichloro-5,6,7,8-tetrahydro-1-naphthol in a manner similar to that described for the preparation of the 5,6,7,8-tetrahydronaphthyl-1-oxyacetic acid of Example 12, except that 21.8 g. (10.1 mole) of 2,4-dichloro-5,6,7,8-tetrahydro-α-naphthol is substituted for the 5,6,7,8-tetrahydro-α-naphthol. The acid obtained has an M.P. of 175°–178° C.

What is claimed is:

1. A compound selected from the group consisting of those of the formulae:

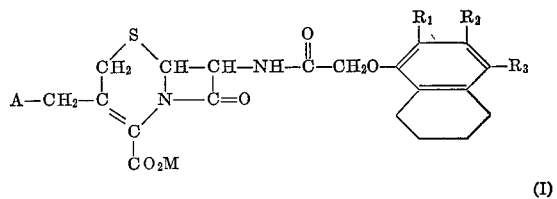

(I)

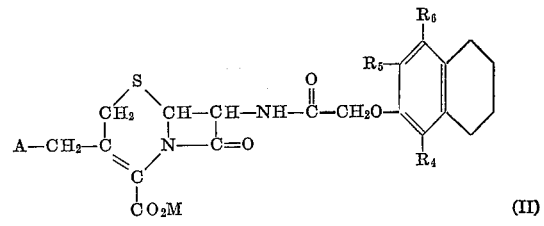

(II)

wherein $R_1$, $R_2$, $R_3$, $R_4$, $R_5$ and $R_6$ are each selected from the group consisting of hydrogen, methyl, chloro and bromo; A is selected from the group consisting of acetoxy and N-pyridinium; and M is selected from the group consisting of hydrogen, pharmaceutically acceptable non-toxic cations and an anionic charge when A is N-pyridinium.

2. A compound according to Formula (I) of claim 1 where $R_1$, $R_2$ and $R_3$ are hydrogen, A is acetoxy and M is hydrogen.

3. A compound according to Formula (I) of claim 1 wherein $R_2$ is methyl, $R_1$ and $R_3$ are hydrogen, A is acetoxy and M is hydrogen.

4. A compound according to Formula (I) of claim 1 wherein $R_1$ and $R_2$ are hydrogen, $R_3$ is methyl, A is acetoxy and M is hydrogen.

5. A compound according to Formula (I) of claim 1 wherein $R_1$ and $R_3$ are chloro, $R_2$ is hydrogen, A is acetoxy and M is hydrogen.

6. A compound according to Formula (I) of claim 1 wherein $R_1$, $R_2$ and $R_3$ are hydrogen, A is N-pyridinium and M is an anionic charge.

7. A compound according to Formula (II) of claim 1 wherein $R_4$, $R_5$ and $R_6$ are hydrogen, A is acetoxy and M is hydrogen.

8. A compound according to Formula (II) of claim 1 wherein $R_4$ and $R_5$ are chloro, $R_6$ is hydrogen, A is acetoxy and M is hydrogen.

9. A compound according to Formula (II) of claim 1 wherein $R_4$ is methyl, $R_5$ and $R_6$ are hydrogen, A is acetoxy and M is hydrogen.

10. A compound according to Formula (II) of claim 1 wherein $R_4$, $R_5$ and $R_6$ are hydrogen, A is N-pyridinium and M is an anionic charge.

No references cited.

NICHOLAS S. RIZZO, *Primary Examiner.*